US009556751B1

(12) United States Patent
Wolverton et al.

(10) Patent No.: US 9,556,751 B1
(45) Date of Patent: Jan. 31, 2017

(54) TURBOCHARGER TURBINE SCATTER SHIELD

(71) Applicants: Ron Wolverton, Mary Esther, FL (US); Christopher Bradly Posadas, Mary Esther, FL (US)

(72) Inventors: Ron Wolverton, Mary Esther, FL (US); Christopher Bradly Posadas, Mary Esther, FL (US)

( * ) Notice: Subject to any disclaimer, the term of this patent is extended or adjusted under 35 U.S.C. 154(b) by 681 days.

(21) Appl. No.: 13/707,104

(22) Filed: Dec. 6, 2012

(51) Int. Cl.
*F01D 25/24* (2006.01)

(52) U.S. Cl.
CPC .................... *F01D 25/24* (2013.01)

(58) Field of Classification Search
CPC ...... F04D 29/70; F04D 29/701; F04D 29/703; F04D 29/403; F04D 29/4206; F04D 29/4226; F04D 29/441; F04D 29/40; F04D 25/06; F01D 21/045; F01D 25/30; F01D 21/04; F01D 21/00; B01D 39/10; F05D 2220/40; F02B 33/40; F01N 2470/04; F01N 3/021; H01R 4/60
See application file for complete search history.

(56) References Cited

U.S. PATENT DOCUMENTS

| | | | | |
|---|---|---|---|---|
| 2,701,682 A | * | 2/1955 | Dallenbach et al. | 417/352 |
| 3,692,436 A | * | 9/1972 | Connor et al. | 417/406 |
| 3,781,126 A | * | 12/1973 | Benisek | 415/143 |
| 3,994,620 A | * | 11/1976 | Spraker et al. | 415/145 |
| 4,288,988 A | * | 9/1981 | Curtil | F01D 9/06 415/205 |
| 4,460,284 A | * | 7/1984 | Lauterbach et al. | 384/126 |
| 4,693,669 A | * | 9/1987 | Rogers, Sr. | 415/143 |
| 4,821,520 A | * | 4/1989 | Rumfield | 60/614 |
| 6,360,731 B1 | * | 3/2002 | Chang | 123/559.1 |
| 6,767,185 B2 | * | 7/2004 | Martin | F01D 9/026 415/205 |
| 7,066,715 B2 | * | 6/2006 | Martin | F01D 9/026 415/203 |
| 7,174,709 B1 | * | 2/2007 | Trager | 60/311 |
| 8,117,830 B2 | * | 2/2012 | Hiranuma et al. | 60/286 |
| 2004/0071550 A1 | * | 4/2004 | Martin | F01D 9/026 415/205 |

(Continued)

OTHER PUBLICATIONS

Garrett, White Paper No. 2 Burst & Containment: Ensuring Turbocharger Safety, Jan. 2012, Garrett by Honeywell.*

*Primary Examiner* — Igor Kershteyn
*Assistant Examiner* — Eldon Brockman
(74) *Attorney, Agent, or Firm* — Peter Loffler (57) ABSTRACT

A scatter guard is interposed between a turbine inlet of a turbocharger and a downpipe and is a ring member that has a pair of opposing flanges, one flange being used to connect the ring to the turbocharger and the other flange being used to connect the ring to the down pipe, each connection being made via a band clamp. One or more spokes are located within the ring and are used to absorb an incoming escaped turbine either to outright stop the turbine or to shatter the turbine into numerous smaller and far less harmful pieces. The inside diameters at each end of the ring may be different to relative to one another in order to eliminate the need to use a step-down adapter whenever the diameter of the turbine inlet and the downpipe mismatch. Alternately, the scatter guard can be used in conjunction with the step-down adapter.

5 Claims, 6 Drawing Sheets

(56) References Cited

U.S. PATENT DOCUMENTS

| | | | |
|---|---|---|---|
| 2004/0075276 A1* | 4/2004 | Lemke | F01N 13/1805 285/367 |
| 2008/0276416 A1* | 11/2008 | Osterchill et al. | 15/422 |
| 2009/0165447 A1* | 7/2009 | Hiranuma et al. | 60/295 |
| 2011/0030353 A1* | 2/2011 | Kamiya et al. | 60/297 |
| 2011/0239645 A1* | 10/2011 | Nagoshi et al. | 60/602 |
| 2012/0255528 A1* | 10/2012 | Gunkel | F01N 13/1811 123/562 |
| 2013/0280056 A1* | 10/2013 | Barlog et al. | 415/203 |
| 2014/0003911 A1* | 1/2014 | Alexander et al. | 415/121.2 |
| 2015/0030436 A1* | 1/2015 | Jorde | 415/121.2 |

* cited by examiner

FIG. 6

TURBOCHARGER TURBINE SCATTER SHIELD

BACKGROUND OF THE INVENTION

1. Field of the Invention

The present invention relates to a guard that helps prevent a turbine of an engine turbocharger from violently exiting the downpipe during a catastrophic turbocharger failure.

2. Background of the Prior Art

A turbocharger is a forced induction device that forces more air and fuel into the combustion chamber of an internal combustion engine than can be achieved if atmospheric pressure alone is used for air-fuel introduction into the engine in the case of a naturally aspirated engine. This increase in air-fuel density entering into the combustion change increases the volumetric efficiency of the engine, which increases the overall performance of the engine in the form of a horsepower output increase.

Unlike a supercharger, which is mechanically tied to the engine itself, the turbocharger does not depend on power from the engine for its operation. The turbocharger uses the kinetic energy from the engine's exhaust gases to drive a compressor that compresses the ambient air prior to the air entering the intake manifold in order to increase the overall mass of air and fuel entering the combustion chamber of the engine. With an increase of air mass within the combustion chamber, the volumetric efficiency of the engine is increased so that the output power of the engine is also increased. Alternately, the turbocharger system can be designed to increase the fuel efficiency of the vehicle in which the device is installed without increasing the engine's power output.

At the heart of the turbocharger's compressor is the turbine which captures the kinetic energy of the exhaust gases that drive the compressor assembly. The turbine faces the downpipe of the exhaust system and spins at rates of up to about 250,000 RPM and can reach temperatures of about 1,500 degrees Fahrenheit.

When a turbocharger is installed in a passenger vehicle and the turbine fails, the typical net result is an unhappy vehicle owner and a happy mechanic as such failures tend to be costly to repair. However, when the turbocharger is installed on a performance vehicle, such as a competition drag racing vehicle, a turbine failure can be substantially more dramatic. In such extreme environments, a turbine failure often results from the turbine shaft failure which causes the turbine to separate from the rest of the compressor. The separated turbine, spinning at transonic speeds and white hot, shoots into the downpipe of the exhaust system to which the turbocharger is installed. At this point the turbine may shoot through the wall of the elbow of the downpipe and pass through the relatively thin firewall of the engine compartment and into the passenger compartment of the vehicle, and possibly directly into the torso of the driver on the opposing side of the firewall, resulting in serious injury or death. Alternately, if the downpipe is sufficiently strong, the turbine travels down the length of the downpipe and exits the vehicle through the exhaust system with the exhaust gases produced. Typically, in order to increase the aesthetic appeal of the competition vehicle, the outlet of the exhaust system may be facing straight upward or may be a side exit. In either case, the turbine, still white hot and weighing several pounds, shoots out of the exhaust outlet at speeds that may be in excess of 100 MPH. If the turbine hits a person, such as a spectator or even a pit crew member if the exhaust system outlet points rearwardly of the vehicle, serious injury or death can occur.

Figure 1:
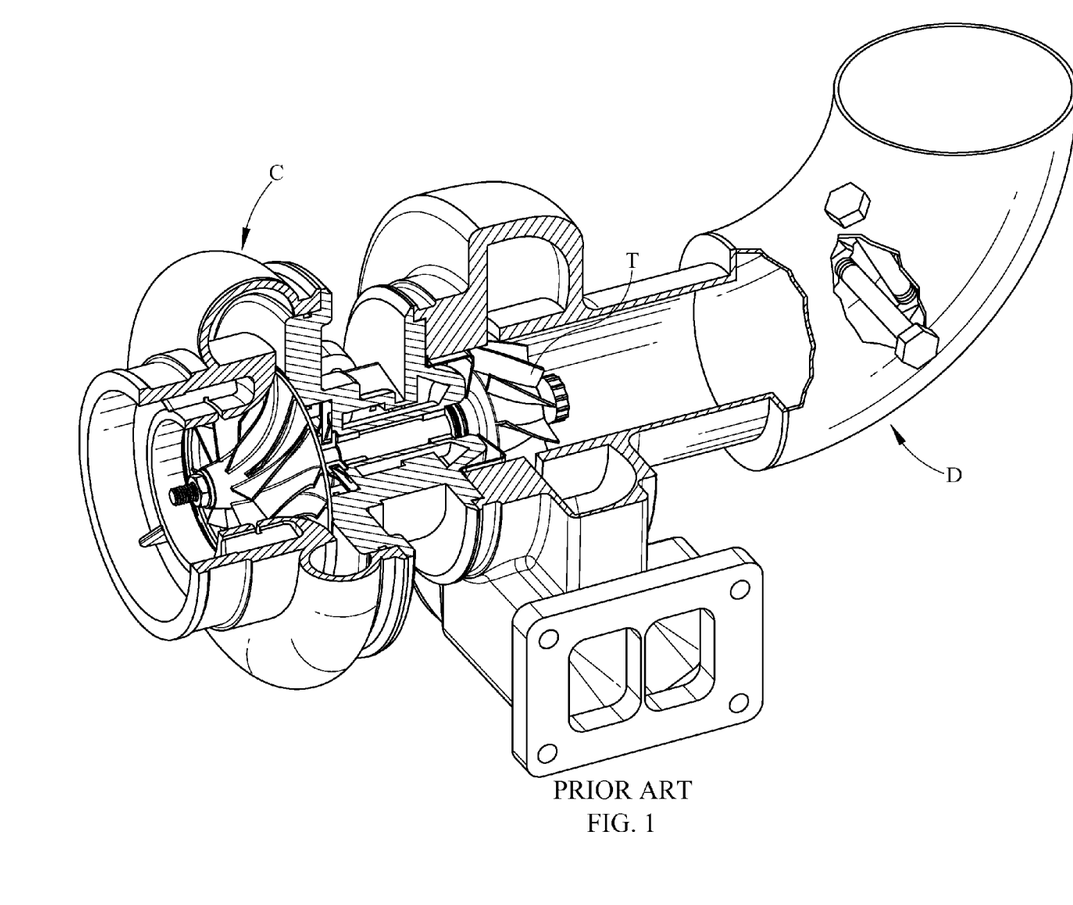
FIG. 1 is a perspective view of the current shield system used in competition vehicles to guard against harm from an escaped turbocharger turbine.
Figure 2:
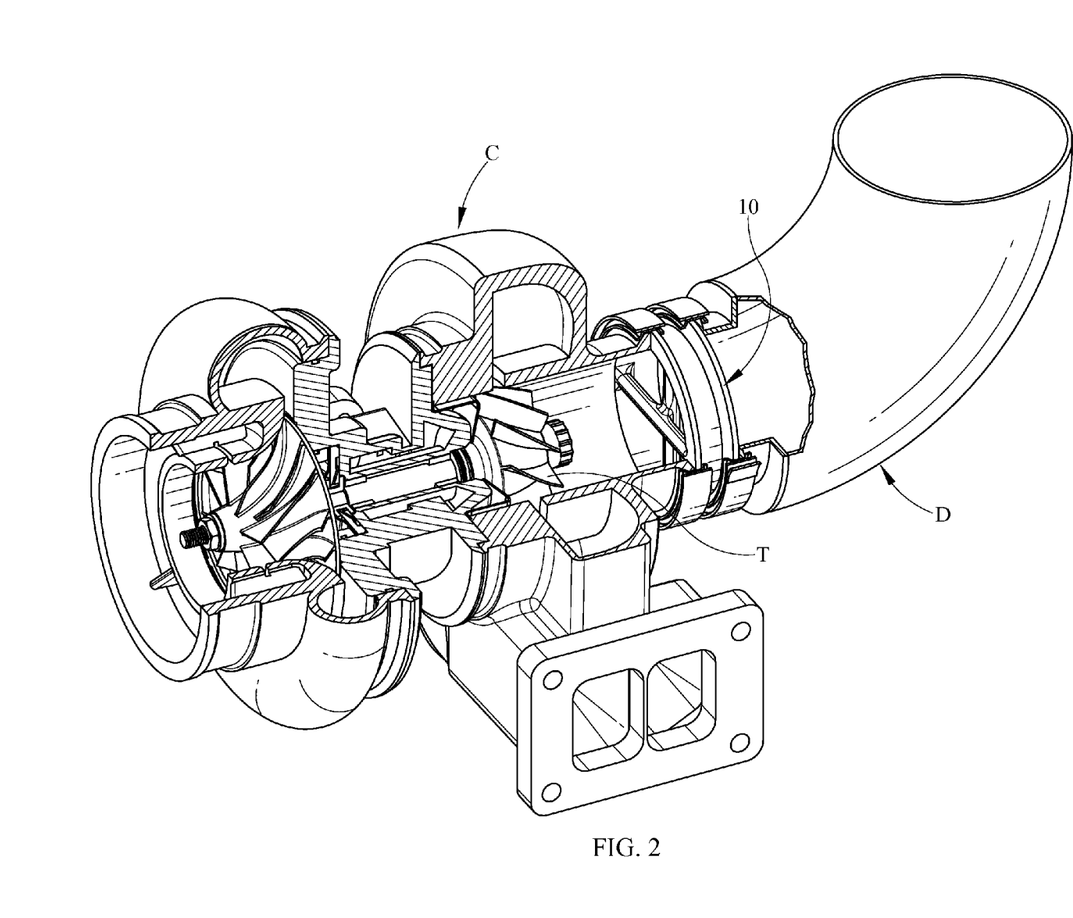
FIG. 2 is a perspective view of the turbocharger turbine scatter guard of the present invention installed within an engine's turbocharger system.
Figure 3:
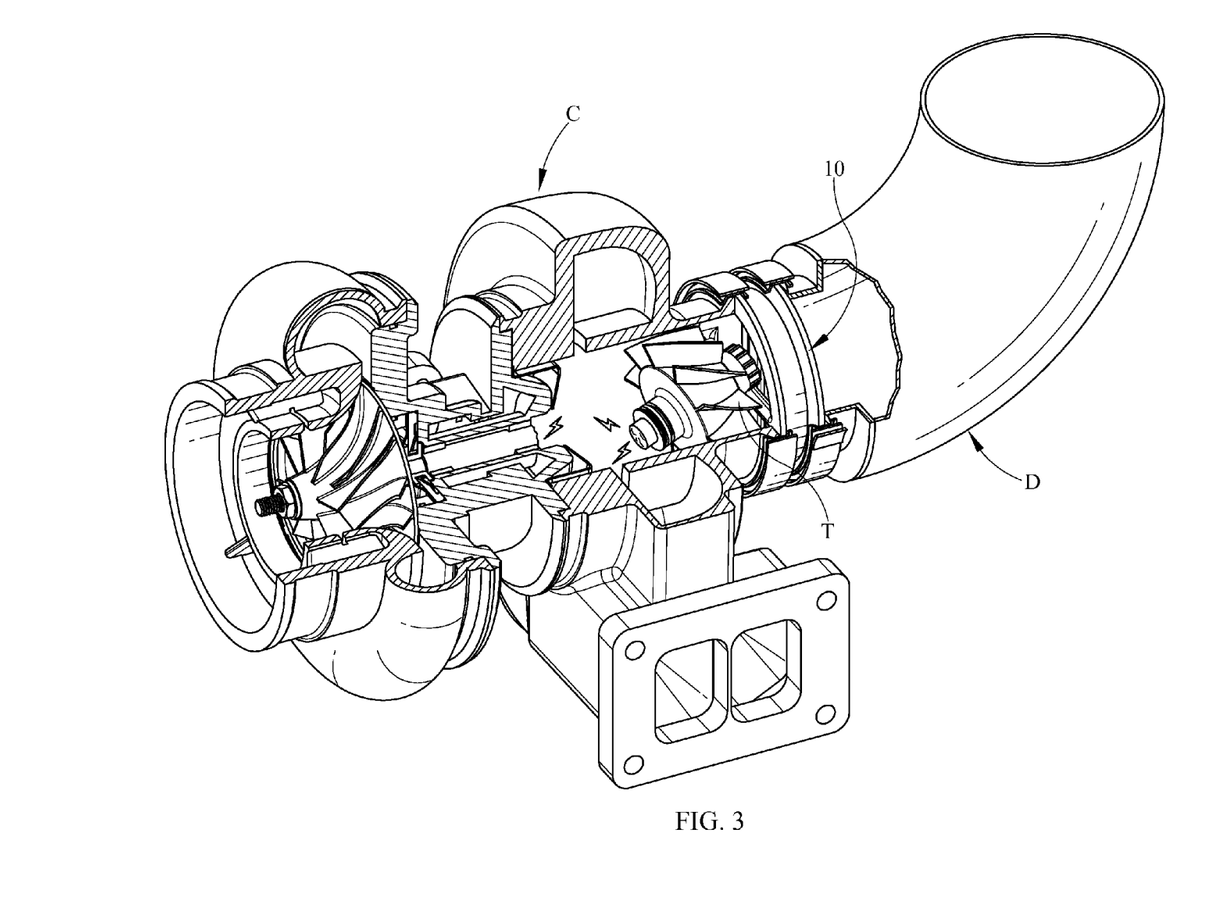
FIG. 3 is a perspective view of the turbocharger turbine scatter guard being impacted by an escaped turbocharger turbine.
Figure 4:
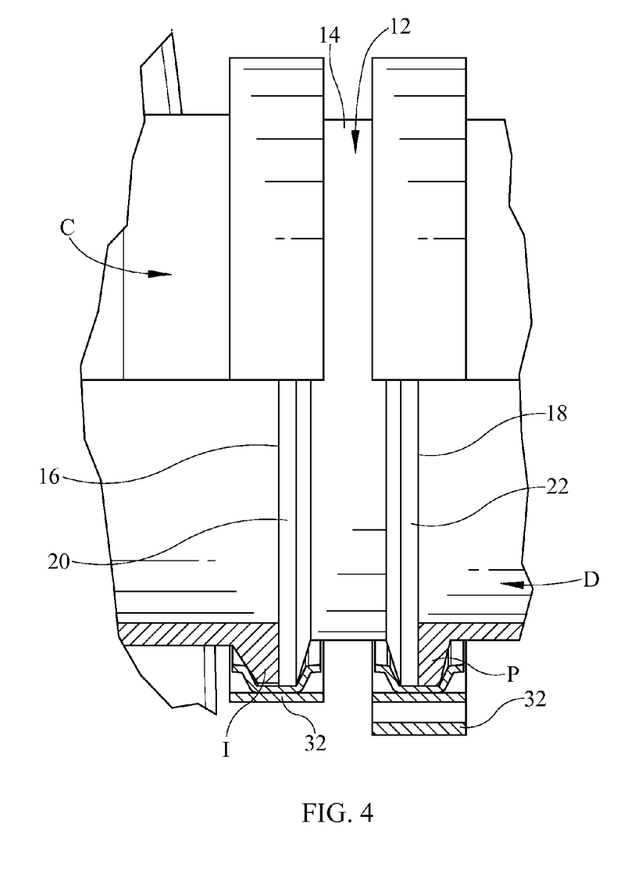
FIG. 4 is a side view, partially sectioned, illustrating attachment of the turbocharger turbine scatter guard within the turbocharger system.

In order to address this potentially deadly problem, and prodded by the rules implemented at many competition venues, many competition vehicle owners install a shield within the downpipe in order to reduce the risk of injury from a broken off turbine of a turbocharger compressor. As seen in FIG. 1, such a shield involves passing a pair of bolts, oriented approximately normal and in close proximity to one another, through the downpipe in a cross pattern. As the turbine engages the bolts, the turbine is either outright stopped or is shattered into smaller fragments, which individually do not have the energy to penetrate the downpipe and firewall or do not have sufficient mass to travel very far when shot out of the outlet of the exhaust system, thereby reducing the potential for injury. While such shielding does reduce injury potential, this type of system is not without its drawbacks.

One shortcoming of this shielding system lies in the fact that many mechanics pass the bolts through corresponding openings made in the downpipe and simply place a nut on the distal end of the bolts in order to secure the bolts thereat, foregoing the more substantial welding process. Such nuts, even if they are lock nuts, can come loose and separate from the bolt, allowing the bolt to separate from the downpipe, due to the extreme vibrations that occur at this part of the engine. In the hectic day of racing, a mechanic may not notice the loss of the bolts, and their attendant shielding capability, during routine inspections of the engine between races.

Another problem with these bolt shields lies in the fact that many mechanics simply use any bolt that can be found to place into the downpipe. While a steel bolt found at a home center supply house may be more than capable of holding a deck board to a joist, the same bolt may quickly shear off when violently interacted with a high speed turbine, thereby not only not resolving the initial problem, but also introducing a pair of bolt fragments into the potentially deadly projectile mix exiting the exhaust system of the vehicle.

Yet another problem lies in the fact that due to size limitations, many mechanics install such bolts on the distal side of the elbow of the downpipe so that the turbine does not encounter the shield until after passing through the elbow of the downpipe. While the shield may protect spectators at the racing event from harm, the turbine can still pass through the downpipe and the firewall and enter the passenger compartment of the vehicle before ever encountering the shield.

What is needed is a shield that either stops an escaped turbocharger turbine or at least substantially reduces the potential danger posed by such a turbine, which shield addresses the above mentioned shortcomings found in the art. Specifically, such a shield must be able to stay in place during the racing day irrespective of the environment in which the shield is installed. Such a device must have sufficient material strength so as to be able to properly assert itself against the extreme violence occasioned onto the shield by a high speed high temperature turbine. Such a device must be designed so that it is installed within the turbo exhaust system at a location whereat both spectators and vehicle passengers are protected by the device irrespective of any size constrains introduced by the downpipe.

SUMMARY OF THE INVENTION

The turbocharger turbine scatter guard of the present invention addresses the aforementioned needs in the art by providing a shield that is located downstream of a turbine of a turbo charger in order to engage the turbine should the turbine break free of the compressor so as to diffuse the potential harm causable by an escaped high speed and very hot turbine by either stopping the turbine outright in its path or shattering the turbine into much smaller pieces that each lack the potential to either penetrate the wall of the downpipe and thereafter the vehicle's firewall or that have insufficient energy to travel very far if ported out of the outlet of the exhaust system. The turbocharger turbine scatter guard is installed within the turbo exhaust housing in such a manner so that the device does not separate from the exhaust system of the engine even if the turbo exhaust housing is producing unusually harsh vibrations throughout the racing day. The turbocharger turbine scatter guard is made of high strength materials that can withstand an engagement with a high speed white hot turbine in order to perform is shielding function. The turbocharger turbine scatter guard is installed between the turbocharger and the downpipe, irrespective of downpipe size so that the driver is protected by the device. The turbocharger turbine scatter guard is relatively easy for mechanics to install within the exhaust system of the engine, often requiring only basic hand tools for such installation and the turbocharger turbine scatter guard is virtually maintenance free once installed. The turbocharger turbine scatter guard is relatively inexpensive to produce so as to incentivize competition vehicle operators to use the device and is produced using standard manufacturing techniques.

The turbocharger turbine scatter guard is comprised of a ring member that has a first end with a first flange thereon, a second end with a second flange thereon, and an inside wall. The first flange abuts against the turbine inlet and is attached thereto while the second flange abuts against the downpipe and is attached thereto. At least one spoke extends from the inside wall of the ring and two or more spokes may be connected to one another, but need not be. A first band clamp is used to attach first flange to the turbine inlet while a second band clamp is used to attach the second flange to the downpipe, such connection being either direct to the turbine inlet and downpipe or via a step-down adapter interposed therebetween. The first flange, the second flange, and the at least one spoke are all of monolithic in construction. The first end of the ring has a first inside diameter and the second end of the ring has a second inside diameter that may be different relative to the first inside diameter.

BRIEF DESCRIPTION OF THE DRAWINGS

Similar reference numerals refer to similar parts throughout the several views of the drawings.

DESCRIPTION OF THE PREFERRED EMBODIMENT

Referring now to the drawings, it is seen that the turbocharger turbine scatter guard of the present invention, generally denoted by reference numeral 10, is comprised of a cylindrical disk member 12 that has a central cylindrical ring 14 having a first end 16 and an opposing second end 18 such that a first flange 20 is located on the first end 16 while a second flange 22 is located on the opposing second end 18 of the ring 14, the two flanges 20 and 22 separated by a channel. The inside diameter ID1 at the first end 16 of the ring 14 may be equal to or different relative to the inside diameter ID2 at the second end 18 of the ring 14 with the outside diameters of the two flanges 20 and 22 respectively corresponding to the inside diameters ID1 and ID2 of the two ends 16 and 18 respectively so that if the two inside diameters ID1 and ID2 are equal, the outside diameters of the two flanges 20 and 22 should also be equal, however, if the inside diameter of the ID1 of the first end 16 of the ring 14 is larger relative to the inside diameter ID2 of the second end 18 of the ring, then the outside diameter of the first flange 20 should be correspondingly larger relative to the outside diameter of the second flange 22, although this is not strictly necessary. In this example, the inside diameter ID1 of the first end 16 of the ring 14 can be made larger relative to the inside diameter ID2 of the second end 18 of the ring 14 either by extending the second flange 22 into the through passage through the ring 14 or sloping the inside wall 24 of the ring 14 in order to narrow the inside diameter ID2 at the second end 18.

Figure 5:
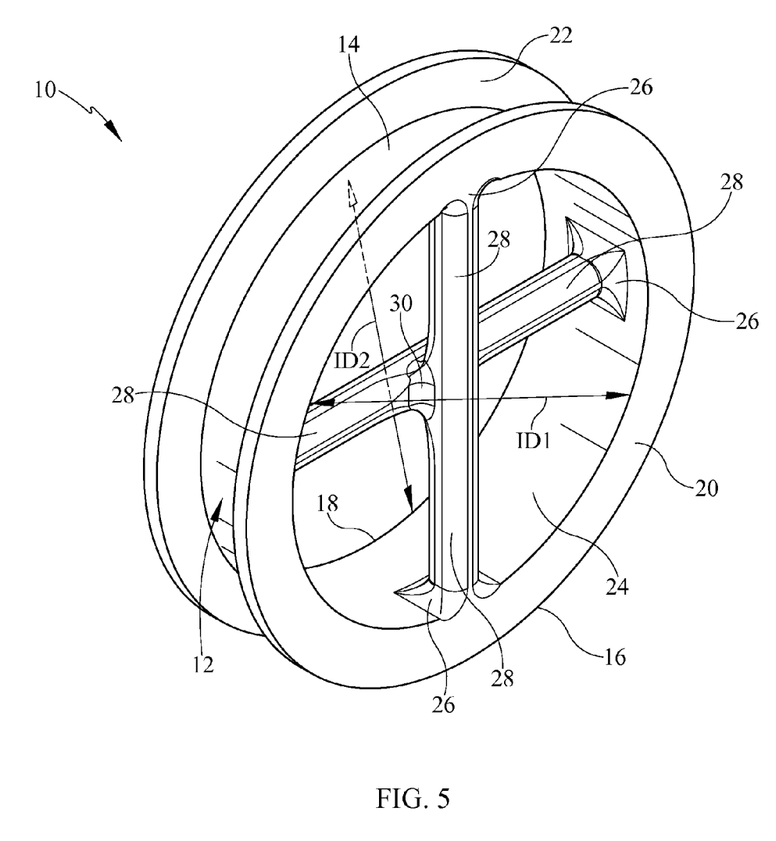
FIG. 5 is a perspective view of the turbocharger turbine scatter guard.
Figure 6:
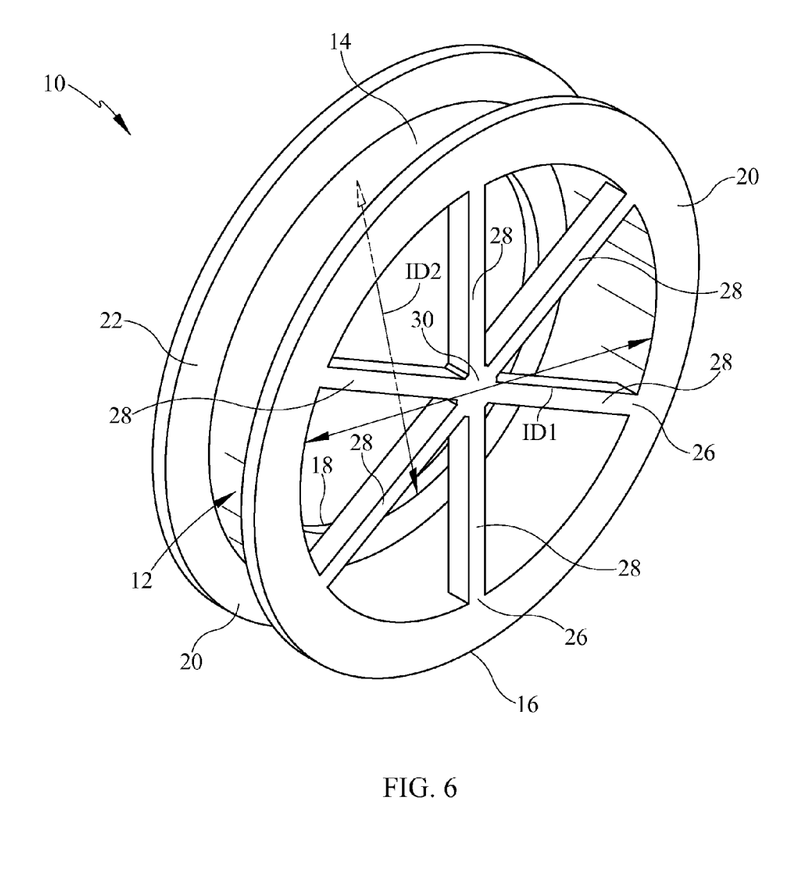
FIG. 6 is a perspective view of the turbocharger turbine scatter guard using an alternate internal spoke configuration.

Extending between one or more points 26 on the inside wall 24 of the ring 14 are at least one, preferably at least two spokes 28, the spokes 28 attached to one another at their meeting point 30. As seen, the attachment points 26 of the spokes 28 may be 90 degrees apart to form the illustrated cross pattern (FIG. 5) or be 60 degrees apart to form the illustrated star pattern (figure) or may be other appropriate patterns, such as a single spoke 28 attached at two different points 26 on the inside wall of the ring 14 which may be located entirely on one side of a centerline passing through the ring 14. Other patterns, such as "peace sign" pattern having three spokes 28 spaced 120 degrees apart, etc., are also possible. The spokes 28 may be vaned or otherwise baffled (not illustrated) and are sized and numbered so as to not unduly restrict air flow through the through passage of the ring 14. The ring 14, including the flanges 20 and 22 and the spokes 28 are formed as a single monolithic unit either via casting or by being machined from a single monolithic block of material. Being monolithic gives the turbocharger turbine scatter guard 10 additional strength relative to a system wherein either the spokes, the flanges, or both, are welded to the ring 14. The turbocharger turbine scatter guard 10 is made from a high strength material that can continually operate in the unusually harsh high temperature environment of a turbocharger system C as well as be able to address the impact from an escaped turbine T. For example, one of the INCONEL alloys produced by Special Metals Corporation of New Hartford, N.Y. proves satisfactory. Other similarly strong materials that can withstand a high heat, multi-duty cycle environment and that can withstand the violent impact of an escaped turbine T can also be used.

The turbocharger turbine scatter guard 10 is installed within the turbocharger system C at the turbine inlet by placing the first flange 20 of the ring 14 against the inlet's flange I and securing the ring 14 thereat by securing the turbocharger turbine scatter guard's first flange 20 to the inlet flange I via an appropriate band clamp 32. The downpipe D is positioned such that its flange P is butted against the second flange 22 of the ring 14 and the two flanges 22 and P are secured via another band clamp 32. The turbocharger turbine scatter guard 10 is now installed and ready for operation. If the turbine T breaks free of the remainder of the turbocharger C, then the turbine T heads into the ring 14 whereat the turbine impacts the spokes 28. The turbine T may be stopped thereat outright or if the turbine T has sufficient energy so as to not be completely stopped by the spokes 28, the spokes 28 cause the turbine T to be shattered into numerous smaller pieces. These smaller pieces tend to lack the energy to pass through the downpipe D or the firewall (not illustrated) therebeyond and should travel along the downpipe D and out of the exhaust system. These small pieces tend to lack the energy to be a substantial threat as each individual piece is too small to have sufficient energy to travel very far beyond the vehicle, having lost much energy in the initial impact with the turbocharger turbine scatter guard and having lost more energy traveling down the downpipe D.

During installation, if the additional height (on the order of a couple of inches) introduced into the turbocharger by the turbocharger turbine scatter guard 10 cannot be sustained due to the preexisting tight fit of the downpipe D within the engine compartment, then an appropriate section of the downpipe D at its proximal end (whereat the downpipe D connects to the turbocharger C) is removed and its flange P is reestablished.

If the diameter of the downpipe D and the diameter of the inlet of the turbocharger C are mismatched, then the turbocharger turbine scatter guard 10 can be used as the size stepper eliminating the need for a separate step-down adapter (not illustrated) that would typically be used for such size mismatching. As such, the inside diameter ID1 of the first end 16 of the ring 14 is matched to the diameter of the turbocharger inlet I and the inside diameter ID2 of the second end 18 of the ring 14 is matched to the diameter of the downpipe D. Alternately, the two inside diameters ID1 and ID2 of the first end 16 and the second end 18 respectively of the turbocharger turbine scatter guard 10 can be the equivalent and the step-down adapter is used in the usual way so that one of the ends 16 or 18 of the ring 14 is butted against the adapter using a band clamp 32 in the usual way and the opposing end 18 or 16 of the ring 14 is butted against its respective attachment point (downpipe or turbine inlet) and attached appropriately via the a band clamp 32 depending on whether the inside diameter of the ring 14 attaches the turbine inlet or downpipe D.

While the invention has been particularly shown and described with reference to an embodiment thereof, it will be appreciated by those skilled in the art that various changes in form and detail may be made without departing from the spirit and scope of the invention.

We claim:

1. A turbocharger turbine scatter guard for attachment between a turbocharger's turbine inlet, the turbine inlet having a first annular flange at an inlet end thereof, the turbine inlet having a first inside diameter at the inlet end, and a downpipe, the downpipe having a second annular flange at a downpipe end thereof, the downpipe having a second inside diameter at the downpipe end, the scatter guard comprising:
    a ring member having a first end with a third annular flange, a second end with a fourth flange and an inside wall, the ring member having a third inside diameter at its first end and having a fourth inside diameter at its second end such that the third annular flange of the ring member is adapted to abut against the first annular flange of the turbine inlet and be attached via a first clamp thereto and the fourth flange is adapted to abut against the second annular flange of the downpipe and be attached via a second clamp thereto and such that the first inside diameter of the turbine inlet is equal to the third inside diameter of the ring member and the second inside diameter of the downpipe is equal to the fourth inside diameter of the ring member; and
    at least one spoke having a third end attached to a first point on the inside wall of the ring member, the at least one spoke having an opposing fourth end attached to a second point on the inside wall of the ring member, the second point being spaced apart from the first point, wherein the ring, the first flange, the second flange, and the at least one spoke are, in combination, monolithic in construction.

2. The scatter guard as in claim 1 wherein the third inside diameter is different relative to the fourth inside diameter.

3. The scatter guard as in claim 1 in combination with the turbocharger.

4. The scatter guard as in claim 3 wherein the ring, the first flange, the second flange, and the at least one spoke are, in combination, are monolithic in construction.

5. The scatter guard as in claim 3 wherein the third inside diameter is different relative to the fourth inside diameter.

* * * * *